3,328,227
HIGHLY TEAR-RESISTANT POLYOLEFIN
BIAXIALLY ORIENTED SHEET
Walter William Moseley, Jr., and Robert Guy Parrish, Wilmington, Del., assignors to E. I. du Pont de Nemours and Company, Wilmington, Del., a corporation of Delaware
Filed Sept. 30, 1966, Ser. No. 598,538
14 Claims. (Cl. 161—112)

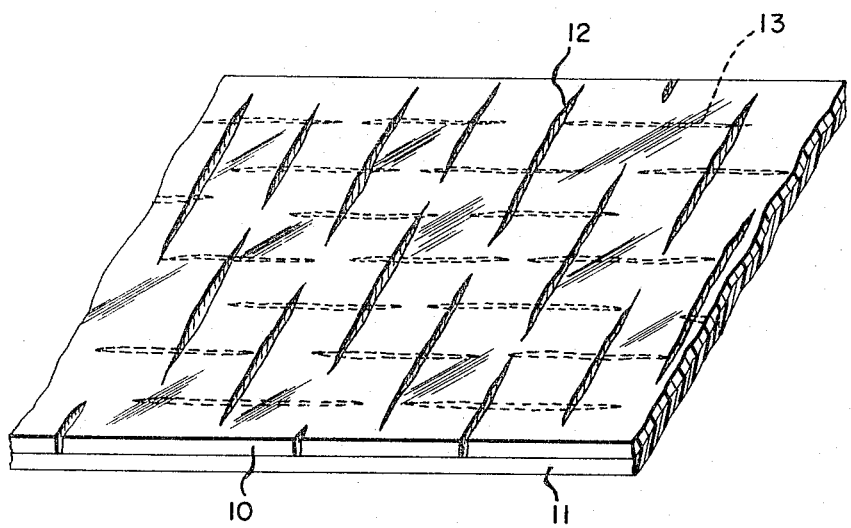

This invention is concerned with structures which comprise a high tear strength, flexible, non-fibrous laminate. More particularly it is concerned with such structures wherein the flexible non-fibrous laminate is formed of layers containing weak channels of gross imperfections. This application is a continuation-in-part of our copending application S.N. 281,647, filed May 20, 1963, now abandoned.

A high tear strength, light weight sheet material is an obviously desirable goal for such end uses as bags, wrapping paper, protective covers, backing sheets and other diverse sheet products. The prior art has long recognized this need, and has responded with various composite structures which have in common an attempt to unite a grid of a reinforcing material of high tensile strength with a light weight sheet (e.g. paper, foil or plastic film) without excessive increases in either the mass or bulk of the structure. The most common examples of such structures incorporate fibrous reinforcing elements ranging all the way from randomly oriented staple fibers through parallel arrays of continuous filaments to woven fabrics. These reinforcing elements are bonded to light weight sheets to contribute improved tear propagation resistance by furnishing a relatively high tensile strength barrier which must be broken in order for a tear to propagate through the sheet. In some structures employing relatively long fibrous reinforcing elements, an intermediate degree of bonding is deliberately sought in order that the fibers retain some degree of transverse mobility in the structure. In these structures the reinforcing elements are swept along during the early stages of tear propagation until a "rope" of elements builds up to prevent further tear propagation.

In spite of the diverse nature of the many techniques heretofore proposed for improving tear propagation properties, nearly all have suffered from the disadvantage that fabrication costs are unduly high. Furthermore the utilization of radically different components to form a composite structure of improved functional properties has been unsatisfactory for many end uses because the products lack suitable aesthetics.

Some of these deficiencies of laminates comprising filamentary/fibrous materials have been circumvented by certain prior art which has provided cross-laminates of films which have been highly drawn to acquire a fibrillar microstructure. Such films may appear isotropic on mere visual inspection, e.g. be monolithic or perhaps even completely transparent, while still having a fibrous character, such as the propensity to shatter into a fibrous mass on being mechanically worked. The fibrillar microstructure in these films serves to improve the tear resistance of the cross-laminate by much the same mechanism as the microfibrous components in the prior art laminates described earlier. Unfortunately, the fibrillar microstructure required can be obtained only by employing films of highly crystalline polymers and drawing these to the maximum extent short of rupture to produce the maximum degree of axial molecular orientation. A further process disadvantage resides in the difficulty in providing sufficiently highly drawn films having the draw direction oriented at a substantial angle to the machine direction of the film. If this is not done, "cross-lamination" can be achieved only by cutting the film into square sections, and rotating one of each pair by 90 degrees before lamination.

It is an object of the present invention to provide multi-ply structures which include flexible, non-fibrous, sheet-like laminates of improved tear propagation properties. A further object of the invention is to achieve such laminates at relatively low cost and with improved aesthetics. These and other objects will be apparent from the remainder of the specification and claims.

In accordance with the present invention there is provided a multi-ply structure comprising a flexible, non-fibrous laminate composed of at least two superposed layers of polymeric sheet material integrally bonded to one another such that the peel strength therebetween is in excess of 0.1 lb./in., said sheet material having a ratio of tear initiation to tear propagation in excess of 200, each said layer containing a plurality of generally parallel weak channels of gross imperfections extending longitudinally of one planar dimension thereof, the channels of one said layer being disposed at an angle of at least 20° with respect to the channels of another said layer, said channels forming a patterned configuration whereby (1) upon tearing the laminate in any straight line direction at least one said channel will be encountered and (2) on the average the projection of each channel of each layer upon a surface of the laminate will intersect the projection of at least one channel in another layer.

The outstanding tear propagation properties of the foregoing laminates are derived from the cross-wise arrangement of weak channels of one layer with respect to weak channels of another layer. Fulfillment of the specified limitations ensures that upon initiation of a tear in any straight line direction, such tear will propagate in that direction only until it encounters one of the weak channels. Although the tear may turn and commence to propagate along this channel, it will subsequently become "trapped" at the intersection of this channel with another channel in a different layer. Each time this occurs, the tear must effectively be re-initiated in order for propagation of the tear across the structure to continue. The high amount of energy required to re-initiate a tear through the layers in the laminates thus gives rise to a greatly increased resistance toward further tearing.

The nature of the so-called "weak channels of gross imperfections" will now be described in greater detail with reference to the several embodiments of the invention. In effect the weak channels are gross inhomogeneities, e.g. structural faults, which render the individual layers anisotropic with respect to tear propagation; that is, as described above a tear initiated transversely of a channel will turn and follow that channel rather than continuing to propagate across it. This directional tear property furnishes a simple and convenient test for indicating whether a given layer possesses the requisite weak channels. Structurally the weak channels are regions whose tear strength is at a minimum, i.e. as compared to surrounding areas of the layer.

Layers containing a plurality of generally parallel weak channels of gross imperfections extending longitudinally of one planar dimension thereof may be readily obtained in a variety of ways. In a preferred form of the invention a film is simply lanced with a parallel array of slits extending throughout the thickness dimension of the film. Two portions of the same channeled film are then adhered to one another in cross-lapped fashion so that in a projected view the slits of one film would appear to obliquely intersect the slits of the other film. An illustration is shown in the drawing of two bonded layers, 10 and 11, each having a generally parallel array of slits, 12 and 13 respectively. Although for improved clarity in the illustration the slits are shown to have actual openings, i.e. as though portions of each layer were removed, such is not necessary and frequently undesirable. A highly suitable channeling effect can also be achieved even if the slits do not extend throughout the entire thickness of the layer; it being essential, of course, that they penetrate sufficiently far so as to be able to divert a tear directed transversely thereof. It will be understood that a layer of the laminate need not comprise a single film but rather may constitute an assembly of several strips or ribbon-like elements of a sheet material arranged in a single plane such that the edges of each strip abut edges of adjacent strips. Each of the weak channels of gross imperfections may also be formed by a series of closely spaced perforations, e.g. as produced by needle punching, or by areas of reduced thickness, e.g. by embossing one or both sides of a sheet material to form a relief pattern. Although the weak channels of any single layer should be generally parallel with one another and extend longitudinally of one planar dimension of the layer, they may be either substantially straight or curvilinear.

Rather than achieving weak channels of gross imperfections by an added step of slitting, perforating, embossing and the like, it is often convenient to initially produce suitable layers in such a manner that they contain density inhomogeneities. Thus upon extrusion of a foam in tube form from an annular shaped orifice, a product can be obtained which exhibits a visibly discernible corrugated effect owing to the presence of density striations.

Formation of high tear propagation strength laminates from layers wherein the weak channels comprise slits is desirable for several reasons. In the first place this embodiment is applicable to a wide variety of sheet materials; for instance non-orientable cast films can readily be employed. Moreover, it is frequently possible to achieve a suitable channeling effect in the same operation in which the sheet material is formed, i.e. such that added operations are not necessary. Of perhaps greatest significance, however, it is not necessary to encounter the adverse effect upon physical properties which is often experienced upon the unidirectional orientation of many film materials.

The sheet materials of the layers used in accordance with this invention must possess a ratio of tear initiation to tear propagation strength in excess of 200. The preferred laminates which exhibit inordinately great tear propagation strength values, are formed of sheet materials having a ratio of tear initiation to tear propagation strength in excess of 1,000. For purposes of this invention tear initiation strength values are determined by the Finch Edge Tear test as described in A.S.T.M. specification D–827 whereas tear propagation values are determined by the tongue tear test, as described in A.S.T.M. specification D–39. In the examples, measurements of Elmendorf Tear test, as described in A.S.T.M. specification D–689, will also frequently be given; in general, such measurements comparing closely with tongue tear test values. A cellophane film is a typical example of a material having a high ratio of tear initiation to tear propagation strength as determined by these tests. This is consistent with the commonly experienced difficulty of starting a tear in a cellophane film which, once initiated, propagates across the film with extreme ease.

Values of initiation and tear propagation strength for any layer are, for consistency, measured in what might be termed the "absence" of the weak channels. Thus where the channels are physically induced by an added step of slitting, embossing and the like, such measurements are conveniently made upon the sheet material either prior to the performance of such step or in such a way that the existence of the channels does not affect the values obtained.

Considering the mechanism of improved tear strength as described above, it might be thought that any ratio of tear initiation to tear propagation in excess of 1.0 should be effective. On the contrary, however, experimentation with a variety of materials has demonstrated that ratios below 200 give generally inconsequential improvements. For this reason it is essential to select only those sheet materials having a very high ratio of tear initiation to tear propagation strength.

Apart from the above considerations with respect to the character of the individual layers which comprise the laminates, it is also necessary in order to obtain high tear propagation strength products that certain limitations be fulfilled concerning both the geometrical arrangement of the layers, i.e. in terms of the relative spacing of their weak channels, and also the strength of the bond formed between the layers.

With respect to the geometry, it is first of all essential that the direction of the generally parallel weak channels of one layer intersect at a substantial angle, i.e. in a projected view, the direction of the generally parallel weak channels of a second layer. Generally such angle should be at least 20° to realize the most significant improvements in tear propagation strength. For laminates containing two weak channeled layers, the preferred angle will be about 30 to 90°. With three such layers the angle may suitably be 60°. Other numbers of layers with such angles are also within the scope of this invention.

A further requirement with respect to the geometrical arrangement of the layers is that the weak channels of the entire laminate form a patterned configuration whereby upon tearing the laminate in any straight line direction at least one channel, preferably three or more, will be encountered. Thus the combined effect of the number, length, and distribution, e.g. staggering, of the weak channels should be to ensure that upon initiation of a tear, it will not continue to propagate without diversion. As a further requirement, the patterned configuration of channels must be such that on the average the projection of each channel of each weak channeled layer upon a surface of the laminate will intersect the projection of at least one weak channel in another layer. In essence, a resistance against continued tear propagation is thus provided at each point where a channel of one layer crosses over and is non-contiguous with a channel of another layer. It will be apparent that a wide variety of patterned configurations may be suitably selected to accomplish the above requirements and, in some cases, even to lend enhanced aesthetics or designs to the products.

For the flexible, non-fibrous laminates of the invention to effectively resist tearing, it is essential that the weak channeled layers be securely bonded to one another. Thus the effective tear propagation strength is at a maximum when the laminate fails other than by delamination of the layers. It has been found that a bond strength or so-called "peel strength" in excess of 0.1 lb./in., as measured by T.A.P.P.I. specification T–806–SM 46, is required to ensure that a substantial improvement in tear propagation strength will be realized before continued tearing of the laminate gives rise to failure by delamination. Ordinarily it is preferred that the peel strength be in excess of 0.8 lb./in. It will be understood that the weak channeled layers must be integrally bonded to one another, i.e. essentially continuously throughout the planar dimensions of the laminate, so that substantial areas of the laminate do not exhibit peel strength values below 0.1 lb./in. The individual weak channeled layers situated in superposed relationship may directly contact one another, e.g. as in the case with thermoplastic films having been adhered by known heat sealing techniques, or may be separated by one or more intermediate non-fibrous layers of adhesive, other films and the like.

For the laminate as a whole to be flexible, hence susceptible of improved tear propagation properties, it is essential that any intermediate layers of adhesive or other materials not only afford the aforementioned minimum peel strength but also be non-brittle. Thus, as each weak channel is encountered during tear propagation, the tear in the weak channel layer must be re-initiated by stretching the edge of the weak channel beyond its break elongation; hence for maximum tear properties the adhesive must not fail before this is accomplished. Rubbery adhesives having modulus values below 50,000 p.s.i., preferably below 5,000 p.s.i., are especially suitable for this purpose, since they will not tend to fail at elongation up to the break elongations of the individual layers. The chemical nature of any adhesive employed will depend, of course, upon the properties of the layers to be joined. Typical suitable adhesives include chloroprene rubber, ethylene/vinyl acetate copolymers of 10–34% vinyl acetate, branched polyethylene, styrene butadiene rubber, polyalkylene ether glycol polyurethanes, etc. These may either be employed in the form of aqueous dispersions or organic solvent solutions.

Because the weak channeling effect can be imparted to the layers of the laminate in a variety of ways, the invention is broadly applicable to that class of flexible, non-fibrous, self-supporting polymeric sheet materials possessing the requisite tear initiation to tear propagation strength ratios. Desirably such sheet materials should be composed of an organic, preferably synthetic organic, polymer. Where the individual layers are films, these may be either isotropic (e.g. either undrawn or biaxially drawn) or may have a degree of axial orientation. However, sheets having a very high degree of axial orientation, as required for the production of a fibrillar microstructure, are not required for the high tear strength laminates of the present invention Considerable latitude can be exercised in the attainment of weak channel layers wherein the channels constitute slits, perforations, embossed patterns or other gross imperfections. Thus the flexible non-fibrous layers of polymeric sheet material for this purpose may be linear or cross-linked. Preferably such layers are substantially isotropic, i.e. prior to the introduction of the weak channels. Dense, non-cellular polymeric films are especially suitable. Films which have been biaxially oriented are especially suitable for the reason that they frequently possess the highest ratios of tear initiation to tear propagation strength. Biaxially oriented films of polyethylene, polypropylene, and polyethylene terephthalate typify this preferred class of materials. Other examples of highly useful layers include foam plastic sheets of polyethylene and other olefin polymers films of branched polyethylene, linear polyethylene, linear polypropylene, polyvinyl fluoride, polyethylene terephthalate, cellophane, polyvinyl chloride, polyimides, copolymers of tetrafluoroethylene with hexafluoropropylene, and blends of certain polyolefins.

In forming a laminate of two weak channel layers of sheet material, it is highly preferred, although not essential, that such layers be of substantially identical composition and structure. The use of layers which differ either in composition or in weak channeling characteristics generally leads to products which are somewhat anisotropic in one or more properties.

In the case where slitted or perforated layers are to be united to form high tear strength laminates, it will be apparent that the laminates themselves may contain voids or openings extending throughout the thickness dimension. Desirably such voids should account for only a fraction, e.g. 10% or less, of the surface area to maintain maximum peel strength values and to avoid excessive losses in tensile strength and other physical properties.

That the laminates of this invention function to achieve improved tear propagation properties is particularly significant and highly unexpected when it is considered that the prior art has sought to attain similar objectives in virtually the opposite manner. Thus in contrast to the provision of high tensile strength barriers, e.g. fibrous reinforcing webbing, as commonly practiced, the invention utilizes weak channels of relatively little or no tensile strength. In addition to the fact that the invention offers economic advantages by the utilization of commercially available materials and low-cost fabrication techniques, it is noteworthy that a great variety of products can now be produced without unnecessarily sacrificing either aesthetics or other desirable functional properties.

It should be noted that the high tear propagation strength products of the invention constitute a radical departure from cross-lamination techniques as heretofore practiced. Thus it has been known to cross-laminate anisotropic, e.g. directionally dependent, films and other materials to obtain products whose longitudinal and transverse properties become averaged out. In striking contrast to such prior art cross-laminated products, the laminates of this invention, prepared with consideration for all the requirements enumerated herein, exhibit tear strengths in excess (as much as 10 times greater or even more) of the normalized tear strength of the individual component layers.

Another prior art technique for producing balanced property sheets is to draw and orient the sheet in two mutually perpendicular directions. While such individual sheets often exhibit a number of improved physical properties, they have neither the structure nor the superior tear strength which characterizes the products of the invention. For use in accordance with this invention, such biaxially oriented sheets must have weak channels introduced (e.g., slits cut), and be suitably cross-laminated.

The flexible non-fibrous laminates, which alone or in combination with other materials comprise multi-ply structures, may suitably be employed in a great variety of applications. The laminates per se are particularly suitable as a high tear strength packaging material for wrapping and protecting foodstuffs and other items of commerce. When combined with one or more exterior layers of plastic films, papers, burlap fabrics, etc., they can be used to impart high tear strength properties for purposes of manufacturing pouches, bags and other containers; for example, as used in the packaging of fertilizers, chemicals and other bulk products. The laminates also form excellent underlay materials when bonded to the underside of carpets or other flooring materials. By fabricating multi-ply structures from the laminates with normally tear susceptible films such as decorative polyvinyl chloride films, e.g. as commonly employed in baby crib padding, outstanding tear resistance is provided. Adherence of a narrow strip of the laminate to the punched edges of ordinary notebook paper pages serves to effectively prevent tearing at those edges.

In a preferred embodiment of the invention, a highly useful packaging material is formed by the utilization of an intermediate barrier film, e.g. a moisture vapor impermeable film, between two or more weak channeled layers. Tear strength properties are particularly outstanding when the flexible nonfibrous laminates are formed to have a thickness of less than 25 mils, preferably less than 5 mils.

The invention will be further illustrated but is not intended to be limited by the following examples.

EXAMPLE I

Four pairs of 6" square sheets of a commercial biaxially oriented polypropylene film having a ratio of tear initiation (Finch tear) to tear propagation (tongue tear) of 2250 are labeled, A, B, C and D. One sheet of each pair is coated on one side with an adhesive composition formed of an oil soluble elastomer in a petroleum naphtha solvent. The adhesive is capable of bonding two layers of the film together to give a peel strength of 1.78 lbs./in. Both sheets of pairs A, B and C are longitudinally cut with a razor blade into parallel section of ⅛ inch, ¼ inch and ½ inch width respectively. Intervals of ⅛ to ¼ inch length are deliberately left unsevered along the direction of the longitudinal cuts to provide a parallel array of slits of 2 to 3 inches in length. The unslit intervals are staggered from one longiutdinal cut to the next to provide a patterned configuration resembling that of the drawing. Set D remains unslit. Each pair is cross-laminated at a force of 15,000 lbs. (with the slits of adjacent layers perpendicular) and cured at 80° C. to produce four separate laminates. Test results on each sample are recorded in Table I.

TABLE I

| Sample | A | B | C | D |
|---|---|---|---|---|
| Basis Weight (oz./yd.²) | 1.78 | 1.88 | 2.00 | 2.1 |
| Thickness (mils) | 4 | 4 | 4 | 4 |
| Tensile (lb./in.//oz./yd.²) | 10.3 | 9.3 | 11.7 | 23.4 |
| Elongation (percent) | 15.8 | 48.1 | 19.8 | 92.0 |
| Elastic Modulus (lb./in.//oz./yd.²) | 226 | 214 | 246 | 236 |
| Elmendorf Tear (g.//g./m.²) | ¹ 8.09 | ¹ 6.21 | ¹ 5.46 | 0.70 |
| Tongue Tear (lb.//oz./yd.²) | 2.23 | 2.15 | 1.87 | 0.07 |

¹ All samples delaminated.

Both measurements of tear propagation strength (Elmendorf tear and Tongue tear) illustrate the dramatic improvement of the slit samples of the invention compared to sample D which lacks the required weak channels. (The corresponding tear strength values by the two tests for a single unlaminated sheet are 0.32 g.//g./m.² and 0.02 lb.//oz./yd.² respectively.) This is true, even though the indicated Elmendorf tear values are "minimum values" limited by delamination strength rather than true tear strength.

Another point illustrated by these samples is that, for this particular biaxially oriented polypropylene film with this particular adhesive, the closer the weak channel spacing (the more frequently a tear must be re-initiated during tear propagation) the higher the observed tear propagation energy. It will further be observed that regardless of which direction is chosen for measurement of tensile strength, effectively ½ of each laminate will have slits cut perpendicular to this direction; hence will be able to contribute very little to overall tensile strength. Accordingly, the tensile strength of samples A, B, and C, normalized to unit basis weight as indicated in the table, is only approximately ½ that of unslit laminate D.

EXAMPLE III

The increased tear propagation strength observed in the weak channeled slit laminates of Examples I and II persists even when an intermediate layer is also incorporated, so long as at least two cross-lapped weak channeled sheets are included in the laminate. Thus, when a vapor barrier structure is desired, an unslit sheet may be incorporated into the structures.

Three sets of three biaxially oriented polypropylene sheets are assembled as follows:

In sets A and B two of the sheets are lanced with ¼ inch laterally spaced slits as in Example I and laminated (with the slits at right angles) to the third unlanced sheet using the same adhesive as in Example I. Set C is laminated directly (all three sheets unslit). Again, the tensile properties indicate the superior tear propagation strengths achieved by use of the weak channeled structures.

TABLE II

| | Position of Unslit Sheet | | |
|---|---|---|---|
| | A | B | C |
| | Between | Outside | None Slit |
| B.W. (oz./yd.²) | 3.12 | 3.32 | 3.08 |
| Thickness (mils) | 5 | 6 | 6 |
| Tensile (lb./in.//oz./yd.²) | 8.90 | 13.48 | 17.17 |
| Elmendorf Tear (g.//g./m.²) | 3.31 | 4.47 | 0.52 |
| Tongue Tear (lb.//oz./yd.²) | 1.75 | 1.64 | 0.10 |

EXAMPLE IV

Two ply laminates are prepared from a variety of sheet materials to test the effect of introducing weak channels (slits) into the component sheets. The slits are cut at ¼ inch lateral spacing and bonded as in Example I and bonded with various adhesives as indicated. As will be apparent, the layers of the first two samples exhibit the highest ratios of tear initation to tear propagation strength; hence provide the greatest improvements in tear resistance.

TABLE III.—EFFECT OF SLITTING OF TEAR STRENGTH OF CROSS-LAMINATED SHEET

| Sample | | Elmendorf Tear (g.//g./m.²) | Tongue Tear (lb.//oz./yd.²) | Finch Tear (lb.//oz./yd.²) |
|---|---|---|---|---|
| | | | | Tongue Tear (lb.//oz./yd.²) |
| Biaxially oriented polyethylene terephthalate film (pressure sensitive tape). | Slit | 9.4 | 0.8 | 1,960 |
| | Unslit | 0.6 | 0.02 | |
| Biaxially oriented linear polyethylene (cemented with adhesive of Example II). | Slit | 3.8 | 0.4 | 2,900 |
| | Unslit | 0.7 | 0.05 | |
| Polyvinylchloride film (pressure sensitive safety tape) | Slit | 1.8 | 0.2 | 100 |
| | Unslit | 1.8 | 0.1 | |
| Unoriented polypropylene film (cemented with adhesive of Example II) | Slit | 1.1 | 0.7 | (¹) |
| | Unslit | 1.9 | 2.4 | |
| Commercial masking tape (pressure sensitive) | Slit | 0.7 | 0.17 | 65 |
| | Unslit | 0.9 | 0.09 | |
| Kraft Paper (cemented with adhesive of Example II) | Slit | 1.2 | 0.13 | 9 |
| | Unslit | 1.4 | 0.17 | |
| Adhesive Tape | Slit | 3.6 | 0.70 | 32 |
| | Unslit | 1.3 | 0.49 | |
| Aluminum Foil (cemented by a rubber adhesive) | Slit | (²) | 0.04 | ³ 72 |
| | Unslit | | 0.04 | |

¹ Elongation too high to measure Finch Tear.
² Too low to measure.
³ Subject to appreciable experimental error, due to very low observed Tongue Tear value.

EXAMPLE II

The experiment of Example I is repeated employing as the adhesive a ketone solution of a synthetic rubber. This adhesive bonds the layers such that peel strength is only 0.15 lbs./in. The Elmendorf tear values of the resultant samples A, B, C and D become 0.85, 1.04, 1.19 and 0.39 g.//g./m.² respectively. Thus, even with this relatively weak adhesive there is a notable improvement in tear propagation strength for the weak channeled laminates over the unslit sample D. However, with this lower peel strength, the optimum lateral spacing between weak channels is now approximately ½ inch or so, representing a compromise between providing a large number of tear initiations per inch and providing sufficient contact area between slits to prevent failure by delamination.

EXAMPLE V

A mixture of 1,000 grams of linear polyethylene (melt index equal 0.5), 750 cc. methylene chloride activating liquid, 135 grams chlorodifluoromethane, and 5 grams "Santocel" (Monsanto trademark for silica aerogel) nucleating agent was charged into a 3 liter stainless-steel pressure vessel. The contents were heated and mixed 6 hours at 150° C. to form a homogeneous solution. Prior to extrusion, the pressure vessel was connected to a source of nitrogen gas at a pressure of 450 p.s.i. Extrusion occurred through a 10 mil annular orifice 3 inches in diameter with a 0.0625″ long parallel land at a velocity of approximately 500 y.p.m. The microcellular sheet product thus produced is in tubular form, approximately 10 inches in diameter, and exhibits longitudinal corrugation, presumably formed during the lateral expansion from the extrusion die. The optical thickness of the cell walls varies from 0.3 to 0.6 micron from the interior to the surface of the sheet. The thickness of polymer at intersections of cell walls is less than 1 micron, characteristic of a polyhedral walled multicellular structure. The cell size ranges from 100 to 200 microns. The polymer molecules in the cell walls are oriented parallel to the plane of the wall to within 10 degrees indicating a high degree of planar orientation. Electron diffraction indicates the 200 reflection is completely absent in most of the cell walls studied, indicating a high degree of uniplanar orientation. The polymer in the line of intersection of bubble walls shows a high degree of axial orientation along the direction of the intersection. The product prepared according to this example has a basis weight of 0.4 oz./yd.$^2$.

These weak channeled microcellular sheets have a bulk density of 0.02 gram/cc. as spun. By applying pressure up to 500 p.s.i. to the face of these sheets for 1½ minutes at a temperature of 50° C. a range of sheet products of increased density up to 0.5 gram/cc. is obtained. These products have remarkably high strength in the machine direction of 22 lbs./in.//oz./yd.$^2$. The tensile strength in the transverse direction is only 4 lbs./in.//oz./yd.$^2$. The Finch tear value is so excessively high for these sheets that a sample undergoes tensile failure. When two such sheets are cross-lapped and bonded with adhesive (or self-bonded by pressing at temperatures near the polymer melting point), they form a composite with exceedingly high tear strength of 2 lbs.//oz./yd.$^2$ (about 20 to 50 times higher than ordinary cellulosic sheets) and tensile strengths as high as 30 lbs./in.//oz./yd.$^2$.

EXAMPLE VI

A polyethylene sheet product is prepared according to the method of Example VI using 1000 grams of melt index 0.5 polymer, 750 cc. methylene chloride, 20 grams Santocel, and 191 grams of chlorodifluoromethane. The autogenous pressure of 435 p.s.i. was increased to 450 p.s.i. with nitrogen gas, and the product extruded at 130 y.p.m. through the 0.010″ die. The properties were as follows:

|  | Basis wt. (oz./yd.$^2$) | Tensile (lbs./in.// oz./yd.$^2$ | Work-to-break (in.-lbs./in.$^2$// oz./yd.$^2$) | Elmendorf Tear (g.//g./m.$^2$) |
|---|---|---|---|---|
| As extruded | 0.5 | 14.5/2.6 | 6.2/1.1 | 0.6/— |
| Pressed | 0.5 | 18/4.7 | 13.1/0.9 | —/— |
| Cross lapped (self bonded) | 0.9 | 15.6/16.3 | 10.9/11.3 | 14.6/9.0 |
| Cross lapped (adhesive bonded) | 1.2 | 11.7/9.7 | 9.5/6.2 | 13.1/21 |

EXAMPLE VII

For this example a pattern of ¼ inch long marks at random positions and random orientations is drawn on a flat surface at such a density that the spacing between marks ranges from about ⅛ to ⅜ inch. A sheet of biaxially stretched polyethylene terephthalate film is placed over the pattern and slits are cut congruent with the marks. This sheet is replaced by a second sheet in which ¼ inch slits are cut perpendicular to, and intersecting the midpoints of, the marks of the pattern. These two sheets are next adhesively laminated in register, thus insuring perpendicular intersection of the randomly oriented weak channels in each sheet with the corresponding channels in the other. The required "cross-lamination" is thus provided by the geometry of the slits rather than by turning the "machine direction" of the sheets at an angle to each other. This technique represents a considerable advantage in a continuous film-lamination process. For comparison, a two-ply laminate of the original unslit film is prepared as well as a cross-laminate of films slit with the preferred array of parallel slits spaced ¼ inch apart. The remarkably superior tear properties of the latter laminate in comparison with the modest improvement for the randomly slit laminate will be apparent from the following:

*2-ply polyethylene terephthalate laminates*

| Sample | Basis wt. (g./m.$^2$) | Elmendorf Tear (g.//g./m.$^2$) |
|---|---|---|
| Random ¼″ slits | 27 | 1.6 |
| Parallel slits | 30 | 11.9 |
| Unslit | 32 | 0.9 |

EXAMPLE VIII

Biaxially oriented polypropylene films are employed to make the laminates of this example. In the first instance, a single unslit sheet having no weak channels is laminated to a sheet having parallel slits cut at a ¼ inch spacing. In the second instance, two identical sheets are prepared with parallel lines of ¼ inch long slits interrupted by ¼ inch spaces, the lines being spaced laterally by ¼ inch, and with the slits in register such that each ¼ inch slit appears opposite a ¼ inch space in the adjacent line. These sheets are cross-lapped and laminated with their lines of slits at 90° and such that the mid-point of a slit occurs opposite the mid-point of a space in the other lamina at each line intersection. The tear propagation strength of each of these laminates is less than that of a corresponding unslit sample since neither of these laminates fulfills the requirement of this invention that weak channels in one lamina must intersect weak channels in another lamina.

What is claimed is:

1. A multi-ply structure comprising a flexible non-fibrous laminate of at least two superposed layers of polymeric sheet material integrally bonded to one another such that the peel strength therebetween is in excess of 0.1 lb./in., said sheet material having a ratio of tear initiation to tear propagation in excess of 200, each said layer containing a plurality of generally parallel weak channels of gross imperfections extending longitudinally of one planar dimension thereof, the channels of one said layer being disposed at an angle of at least 20° with respect to the channels of another said layer, said channels forming a patterned configuration whereby (1) upon tearing the laminate in any straight line direction at least one said channel will be encountered and (2) on the average the projection of each channel of each layer upon a surface of the laminate will intersect the projection of at least one channel in another layer.

2. The structure of claim 1 wherein said sheet material has a ratio of tear initiation to tear propagation in excess of 1000.

3. The structure of claim 1 wherein said angle is about 30 to 90°.

4. The structure of claim 1 wherein said layers of the laminate are substantially identical.

5. The structure of claim 1 wherein said laminate contains one said layer adjacent each face of an intermediate barrier film.

6. The structure of claim 1 wherein said laminate has a thickness of less than about 25 mils.

7. The structure of claim 1 which consists of said laminate.

8. The structure of claim 1 wherein said peel strength is in excess of 0.8 lb./in.

9. The structure of claim 1 wherein said weak channels of gross imperfections are slits extending throughout the thickness dimension of the layers.

10. The structure of claim 9 wherein said layers are formed of substantially isotropic sheet material.

11. The structure of claim 10 wherein said layers are formed of a biaxially oriented sheet material.

12. The structure of claim 1 wherein said layers are formed of a dense, non-cellular polymeric film.

13. The structure of claim 1 wherein said weak channels of gross imperfections are density inhomogeneities in said layers.

14. The structure of claim 13 wherein said layers comprise a cellular polyolefin sheet material.

No references cited.

ALEXANDER WYMAN, *Primary Examiner.*

R. A. FLORES, *Assistant Examiner.*